US011344974B2

(12) United States Patent
Trigui et al.

(10) Patent No.: US 11,344,974 B2
(45) Date of Patent: May 31, 2022

(54) OPTIMIZED METHOD AND SYSTEM FOR INTERNAL COATING OF FIELD GIRTH WELDS

(71) Applicant: Saudi Arabian Oil Company, Dhahran (SA)

(72) Inventors: Hassane Trigui, Thuwal (SA); Sahejad Patel, Thuwal (SA); Brian Parrott, Thuwal (SA); Mohamed Abdelkader, Thuwal (SA); Abdoulelah Hannabi, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 343 days.

(21) Appl. No.: 16/654,861

(22) Filed: Oct. 16, 2019

(65) Prior Publication Data

US 2021/0114142 A1 Apr. 22, 2021

(51) Int. Cl.
*B23K 31/12* (2006.01)
*B23K 103/04* (2006.01)
*B23K 101/10* (2006.01)

(52) U.S. Cl.
CPC ........ *B23K 31/125* (2013.01); *B23K 2101/10* (2018.08); *B23K 2103/04* (2018.08)

(58) Field of Classification Search
CPC .............. B23K 31/125; B23K 2101/10; B23K 2103/04; G01N 2021/9544;
(Continued)

(56) References Cited

U.S. PATENT DOCUMENTS 6,687,571 B1 * 2/2004 Byrne .................. G05D 1/0289 700/39
8,633,713 B2 1/2014 Langley et al.
(Continued)

FOREIGN PATENT DOCUMENTS

GB 2492894 A 1/2013
JP H06206048 A 7/1994
(Continued)

OTHER PUBLICATIONS

International Search Report and Written Opinion in Corresponding PCT Application No. PCT/US2020/054388 dated May 3, 2021. 18 pages.

*Primary Examiner* — Kiley S Stoner
(74) *Attorney, Agent, or Firm* — Leason Ellis LLP

(57) ABSTRACT

A system for performing multiple operations on one or more weld joints of a pipe string includes a robotic scanning device that is configured to controllably travel inside of the pipe string and detect, scan and uniquely identify each weld joint within the pipe string. The system further includes a plurality of secondary robotic devices that are each configured to controllably travel inside of the pipe string and perform one or more specific operations on the one or more weld joints of the pipe string. The robotic scanning device includes a processor that is configured to generate a work plan for the plurality of secondary robotic devices. The robotic scanning device transmits work plan commands to each of the plurality of secondary robotic devices and receive transmissions from the plurality of secondary robotic devices.

25 Claims, 9 Drawing Sheets

Start 200
Drive 210
Camera to detect welds 215
Weld ? 220
225 No
Yes
Weld Identification Weld Number Weld Position 230
Weld Characterization Profile Measurement Analysis 240
Max Distance ? 250
No
Yes
Generate Work-Plan 255
260
Send to Units
Directions to welds
Grinder: Desired grinding profile / weld
Blasting: Amount of blasting / weld
Coating: Amount of Coating / weld
Inspection / weld
Timetable
Collect Updates from other Units 270
Received from Units
Grinding Progress
Blasting Progress
Coating Progress
Inspection Progress and results
Operator Feedback and consent
Work-Plan Completed ? 280
285 No
Yes
Drive Back 290
End 295

(58) Field of Classification Search
CPC ......... G01N 2021/9548; G01N 21/954; G05D 2201/0207; G05D 1/0295
USPC ........................................ 228/102–105, 8–12
See application file for complete search history.

(56) References Cited

U.S. PATENT DOCUMENTS

| | | | | |
|---|---|---|---|---|
| 8,800,396 | B2 | 8/2014 | Langley et al. | |
| 9,821,415 | B2 * | 11/2017 | Rajagopalan | B23K 37/0531 |
| 2003/0198374 | A1 * | 10/2003 | Hagene | G01N 21/954 382/141 |
| 2010/0147047 | A1 * | 6/2010 | Kerdiles | B25D 11/06 72/367.1 |
| 2010/0312387 | A1 | 12/2010 | Jang et al. | |
| 2011/0107571 | A1 * | 5/2011 | Kerdiles | B24B 39/026 29/90.7 |
| 2017/0182605 | A1 * | 6/2017 | Rajagopalan | B23K 37/003 |
| 2018/0029154 | A1 * | 2/2018 | Rajagopalan | B23K 37/0531 |
| 2018/0031152 | A1 * | 2/2018 | Rajagopalan | B23K 37/003 |
| 2018/0036890 | A1 * | 2/2018 | Hollister | G01S 17/88 |
| 2018/0117718 | A1 | 5/2018 | Rajagopalan et al. | |
| 2018/0196404 | A1 * | 7/2018 | Stilwell | B25J 9/1682 |
| 2018/0202944 | A1 * | 7/2018 | Sanchez | B05D 7/222 |
| 2018/0313715 | A1 * | 11/2018 | Cichosz | G01M 3/40 |
| 2020/0173879 | A1 * | 6/2020 | Morris | G01M 3/005 |
| 2021/0308782 | A1 * | 10/2021 | Sakurai | G01N 21/95 |
| 2021/0379689 | A1 * | 12/2021 | Takahashi | B23K 11/11 |

FOREIGN PATENT DOCUMENTS

| | | | |
|---|---|---|---|
| WO | 2012167380 | A1 | 12/2012 |
| WO | 2018109438 | A1 | 6/2018 |
| WO | 2019157545 | A1 | 8/2019 |

* cited by examiner 320
327
325
324
Location Sensors
Processor
Communications Module
Memory
Vision System
Drive Mechanism
321
326
322

OPTIMIZED METHOD AND SYSTEM FOR INTERNAL COATING OF FIELD GIRTH WELDS

TECHNICAL FIELD

The present disclosure is directed to a system and method to coordinate and execute specific tasks required to complete the coating of field girth welds inside pipes using in-pipe robotic crawlers. One exemplary system comprises a robotic crawling system that comprises a scanning unit, weld grinding unit, surface roughness preparation unit, coating unit, and a coating inspection unit, along with a scanning unit that not only performs scanning operations but also is configured to generate a detailed operating schedule and job mission for each girth weld specifying the task type, time and location, thereby resulting in optimization of resource allocation.

BACKGROUND

Metallic (e.g., carbon steel) pipelines are generally assembled in the field using girth welding techniques. Traditionally, pipes are delivered to the construction (installation) site in 12 meter sections that are pre-coated both internally and externally, except at the joint locations. These pipe sections are then welded together in the field (field girth welding) to form pipe strings of hundreds of meters.

This involves the welding together of abutting pipe ends with the weld bead protruding into the interior of the pipe, filling the entire gap between the abutting ends, and extending to a weld bead head on the outside of the joint around the entire girth of the weld. Upon completion of the girth welds, the welded joint and the surrounding surface of the pipe area must be coated to prevent corrosion at the joint. In such cases, robotic crawlers are used to reach the internal girth welds inside pipe strings of hundreds of meters to perform the coating task. The in-pipe girth weld coating process is a very complicated mission that requires multiple subtasks to be performed in succession.

The current coating process for a weld joint is composed of multiple steps and functions to guarantee that the protective coating layer would last for a long time. First, the surface intended to be coated needs to be blasted and roughened prior to coating. This is basically roughening the surface in order to have an optimal bonding between the surface and the coating particles. Afterwards, the coating is sprayed on top of the area of interest. After this step, the coating is cured and the surface has to be inspected to ensure that there are not any discontinuities, holidays or pinholes that may affect the coating integrity. The above sequential jobs need to be performed perfectly in order to guarantee the integrity of the pipe string. There is therefore a need and desire to have an improved system and method for coordinating between these successive subtasks to perform a full coating job perfectly.

SUMMARY

In one implementation, a system for performing multiple operations on one or more weld joints of a pipe string includes a robotic scanning device that is configured to controllably travel inside of the pipe string and detect, scan and uniquely identify each weld joint within the pipe string. The system further includes a plurality of secondary robotic devices that are each configured to controllably travel inside of the pipe string and perform one or more specific operations on the one or more weld joints of the pipe string. The robotic scanning device includes a processor that is configured to generate a work plan for the plurality of secondary robotic devices. The robotic scanning device transmits work plan commands to each of the plurality of secondary robotic devices and receive transmissions from the plurality of secondary robotic devices.

The work plan includes for one or more of the secondary robotic devices: (1) a start time for each of the one or more secondary robotic devices at one or more of the uniquely identified weld joints of the pipe string; and (2) an estimated time needed for each of the one or more secondary robotic devices to perform the one or more specific operations on the respective uniquely identified weld joint.

The present invention is thus directed to a system and method to coordinate and execute specific tasks required to complete the coating of field girth welds inside pipes using in-pipe robotic crawlers. One exemplary system comprises a robotic crawling system that comprises a scanning unit, weld grinding unit, surface roughness preparation unit, coating unit, and a coating inspection unit, along with a scanning unit that not only performs scanning operations but also is configured to generate a detailed operating schedule and job mission for each girth weld specifying the task type, time and location, thereby resulting in optimization of resource allocation.

In another aspect, a method for performing multiple operations on one or more weld joints of a pipe string comprising steps of:

- detecting and scanning the one or more weld joints within the pipe string using a robotic scanning device;
- generating a work plan for a plurality of secondary robotic devices that are configured to controllably travel inside of the pipe string and perform one or more specific operations on the one or more weld joints of the pipe string including surface preparation of the one or more weld joints, coating the one or more weld joints and inspecting the coating of the one or more weld joints, the work plan being generated by a processor of the robotic scanning device and transmitted from the robotic scanning device to the plurality of secondary robotic devices;
- deploying the plurality of secondary robotic devices inside the pipe string;
- preparing a surface of each weld joint using a surface preparation device that comprises one of the secondary robotic devices;
- coating each weld joint, after the surface of the weld joint has been prepared, using a coating device that comprises one of the secondary robotic devices;
- inspecting each coated weld joint using a coating inspection device that comprises one of the secondary robotic devices;
- monitoring the progress of the one or more operations being performed by the plurality of secondary robotic devices by collecting updates at the scanning device from the plurality of secondary robotic devices; and
- confirming that the work plan was completed and then driving the scanning device along the pipe string and performing a final check of each joint weld.

BRIEF DESCRIPTION OF DRAWING FIGURES

Figure 5:
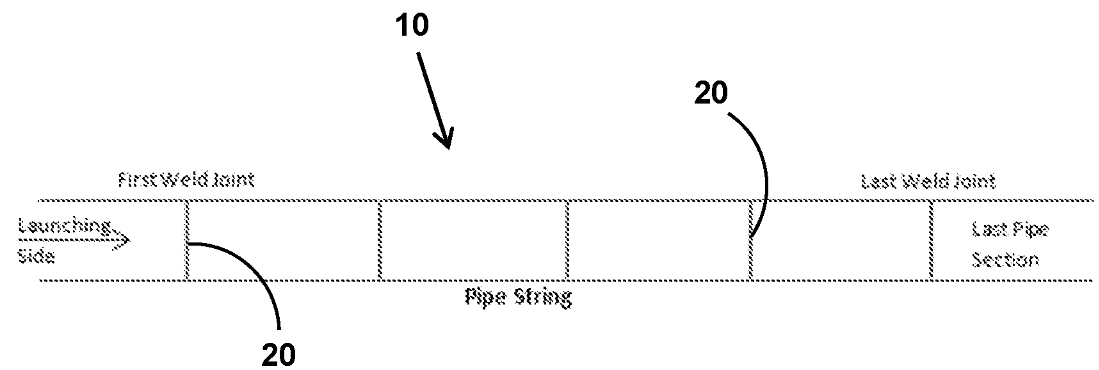
Figure 6:
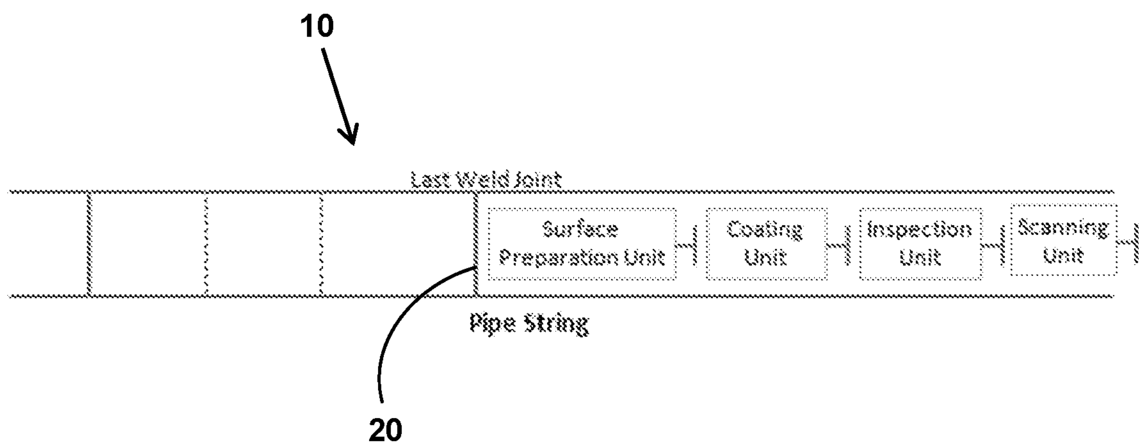

FIG. 5 is a view of a pipe string made up of a plurality of pipe sections with weld joints formed at the end-to-end connections of the pipe sections; and FIG. 6 is a view of a pipe string made up of a plurality of pipe sections with weld joints formed at the end-to-end connections of the pipe sections with the robotic devices of the system being shown in a parked position beyond the last weld joint.

DETAILED DESCRIPTION OF CERTAIN EMBODIMENTS

Broadly speaking, the present disclosure is directed to a system and method that improve and optimize the present methods used to coat field girth welds. The present system and method is configured to perform the planning, coordination and execution of the tasks required for a complete coating job of field girth welds from inside the pipes using in-pipe crawlers (robotic devices) that form a part of the present system as described herein. As set forth in more detail below, the present system and method are based on a robotic crawling system comprised of a number of tools (pieces of equipment/instruments) including but not limited to: a profile scanning tool, weld grinding tool, surface roughness preparation tool, coating head and coating inspection instruments. As described herein, each of these tools can be in the form of a robotic device (crawler) that controllably moves within the inside of the pipe string. The robotic crawler executes the above-mentioned functions in a sequential manner to guarantee the completion of the coating job according to the best (optimal) practice recommendations and standards. The present system and method can include the use of a high resolution scanning device (tool) to scan the condition of the girth welds and ensure that the weld bead penetration is smooth and free of sharp edges. In the event that the weld bead needs in-situ rectification, a grinding tool can be used before performing the surface preparation step.

Now referring to FIGS. 1-6 in which an exemplary system 100 is illustrated and is configured to organize the in-pipe joint coating subtasks, that are described above and herein, and then generate a complete mission (work plan) and optimize resource allocation with regard to the resources (equipment/tools) needed to perform these subtasks.

The system 100 includes a scanning device (unit) 110 that comprises a robotic (crawler) vehicle whose function is to, at least: (1) assess the condition of the girth welds 20 that are part of a pipe string 10; and (2) generate a work plan for each girth weld 20 accordingly. As described herein, the work plan is a plan for inspecting, repairing (if necessary), preparing the surface for coating, coating the surface, and inspecting the surface post-coating.

Figure 1:
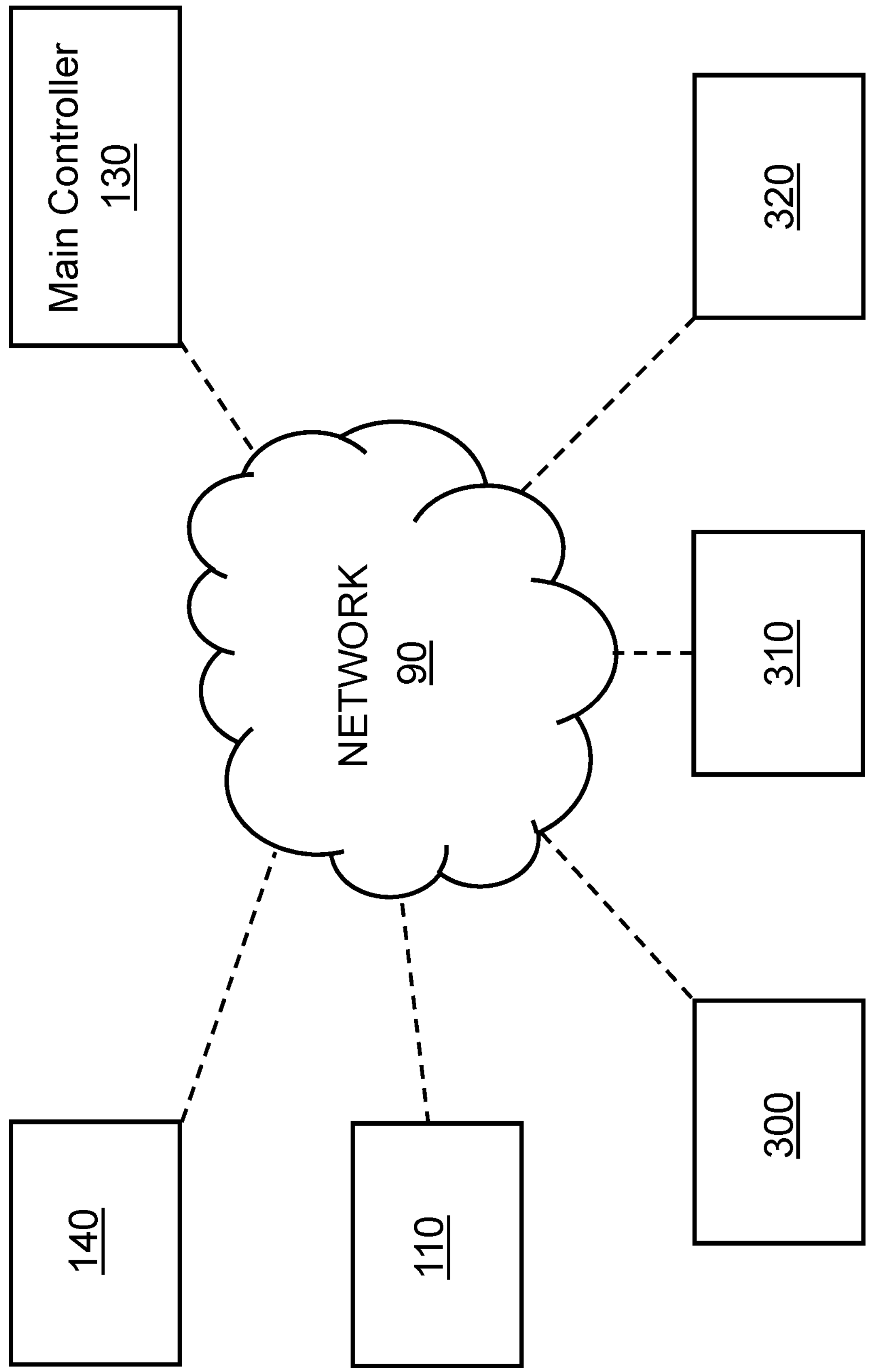
FIG. 1 is a block diagram illustrating an exemplary network configuration in accordance with one or more implementations of the present system.

As shown in FIG. 1, the scanning device 110 communicates with other robotic devices over a communications network 90 to allow information to be communicated both between the scanning device 110 and the other robotic devices and between the various devices and a main or server computing device 130 that is typically located outside the pipe string 10. These details are described in more detail herein. This arrangement allows for the operator to view substantially in real-time images and live video feed of the weld joint, as well as data and measurement taken at the weld joint and also allows the operator to control certain movements of the various devices if necessary.

With continued reference to FIG. 1, various forms of computing devices are accessible to the network 90 and can communicate over the network to the various machines that are configured to send and receive content, data, as well as instructions that, when executed, enable operation of the various connected robotic devices within the pipe string 10. The content and data can include information in a variety of forms, including, as non-limiting examples, text, audio, images, and video, and can include embedded information such as links to other resources on the network, metadata, and/or machine executable instructions. Each computing device can be of conventional construction, and while discussion is made in regard to servers that provide different content and services to other devices, such as mobile computing devices, one or more of the server computing devices can comprise the same machine or can be spread across several machines in large scale implementations, as understood by persons having ordinary skill in the art. In relevant part, each computer server has one or more processors, a computer-readable memory that stores code that configures the processor to perform at least one function, and a communication port for connecting to the network 90. The code can comprise one or more programs, libraries, functions or routines which, for purposes of this specification, can be described in terms of a plurality of modules, residing in a representative code/instructions storage, that implement different parts of the process described herein. As described herein, each of the robotic devices (tools) has a controller (processor) and thus, comprises one form of the above-described computing device.

Further, computer programs (also referred to herein, generally, as computer control logic or computer readable program code), such as imaging or measurement software, can be stored in a main and/or secondary memory and implemented by one or more processors (controllers, or the like) to cause the one or more processors to perform the functions of the invention as described herein. In this document, the terms "memory," "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like. It should be understood that, for mobile computing devices (e.g., tablet), computer programs such as imaging software can be in the form of an app executed on the mobile computing device.

Figure 2A:
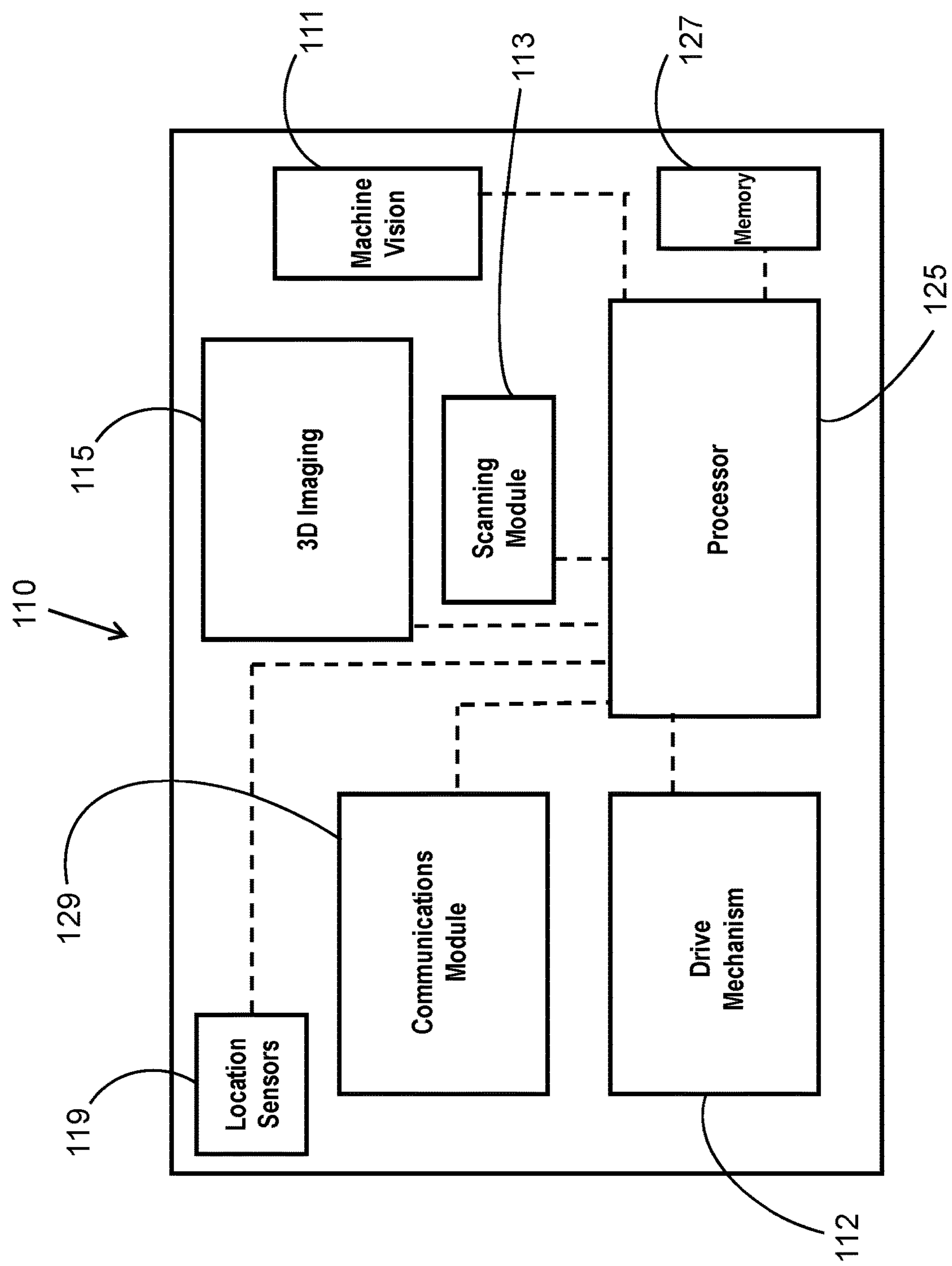
FIGS. 2A-2E are block diagrams illustrating exemplary hardware components of the system in accordance with one or more implementations.
Figure 2B:
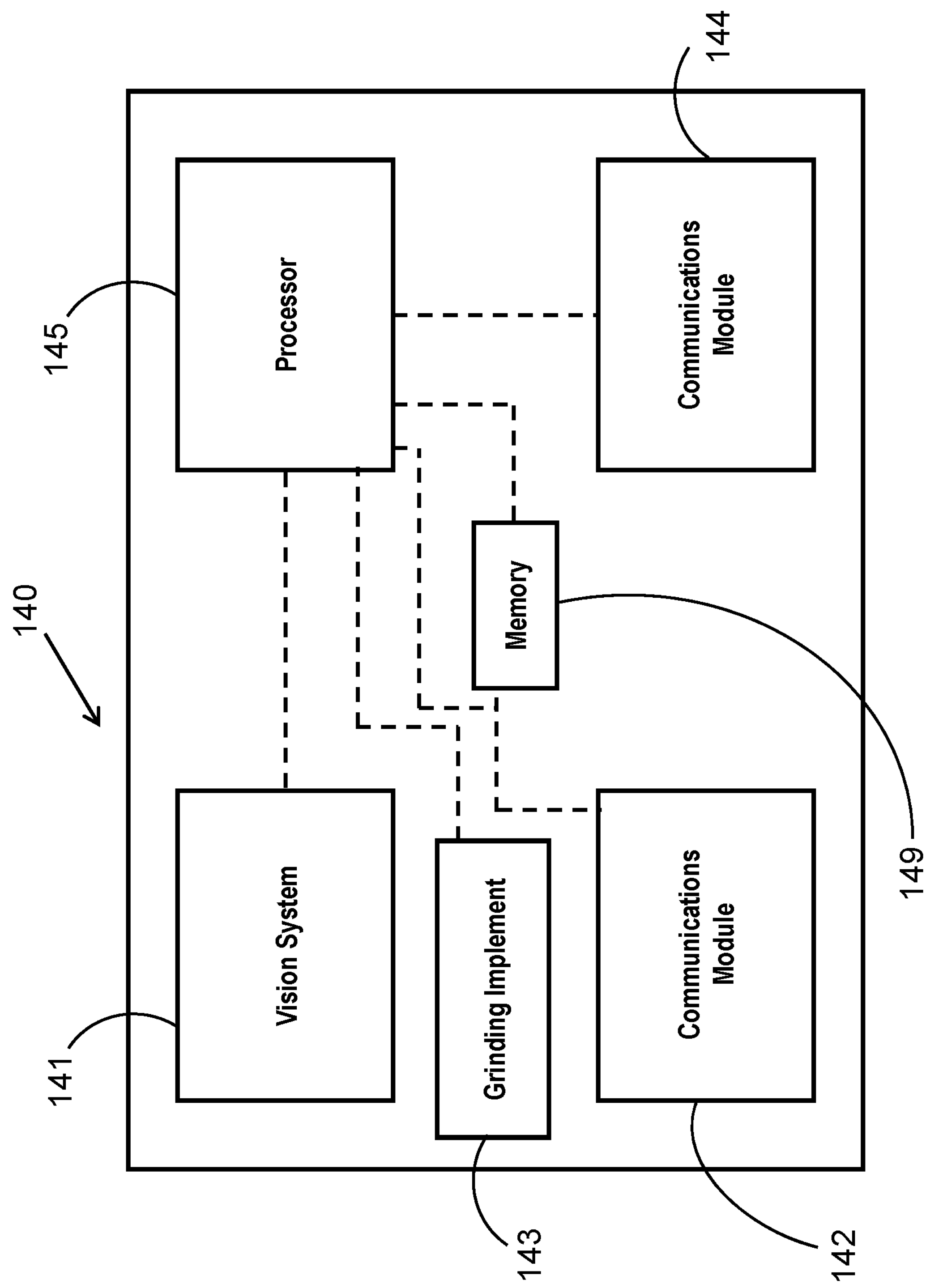
Figure 2C:
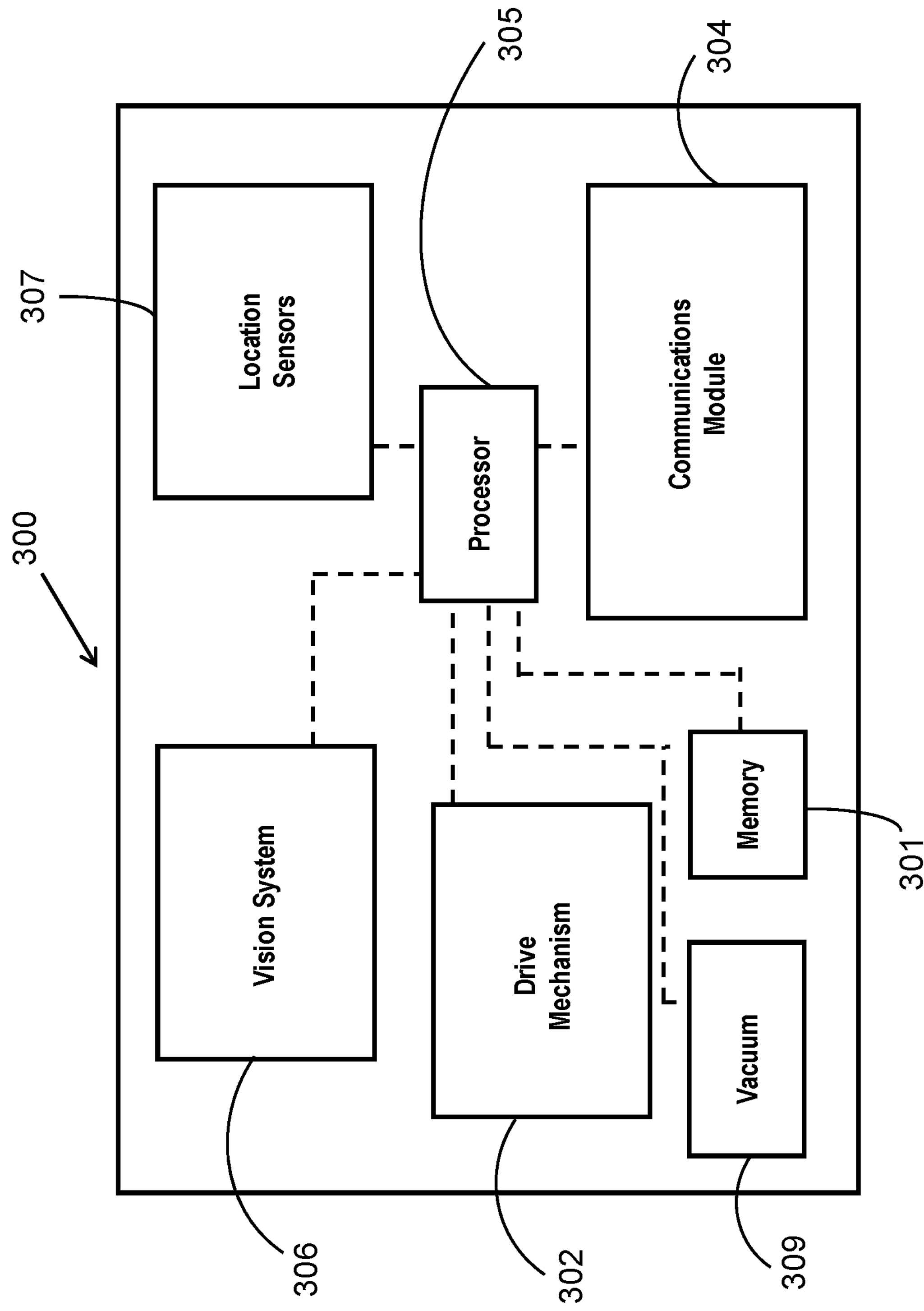
Figure 2D:
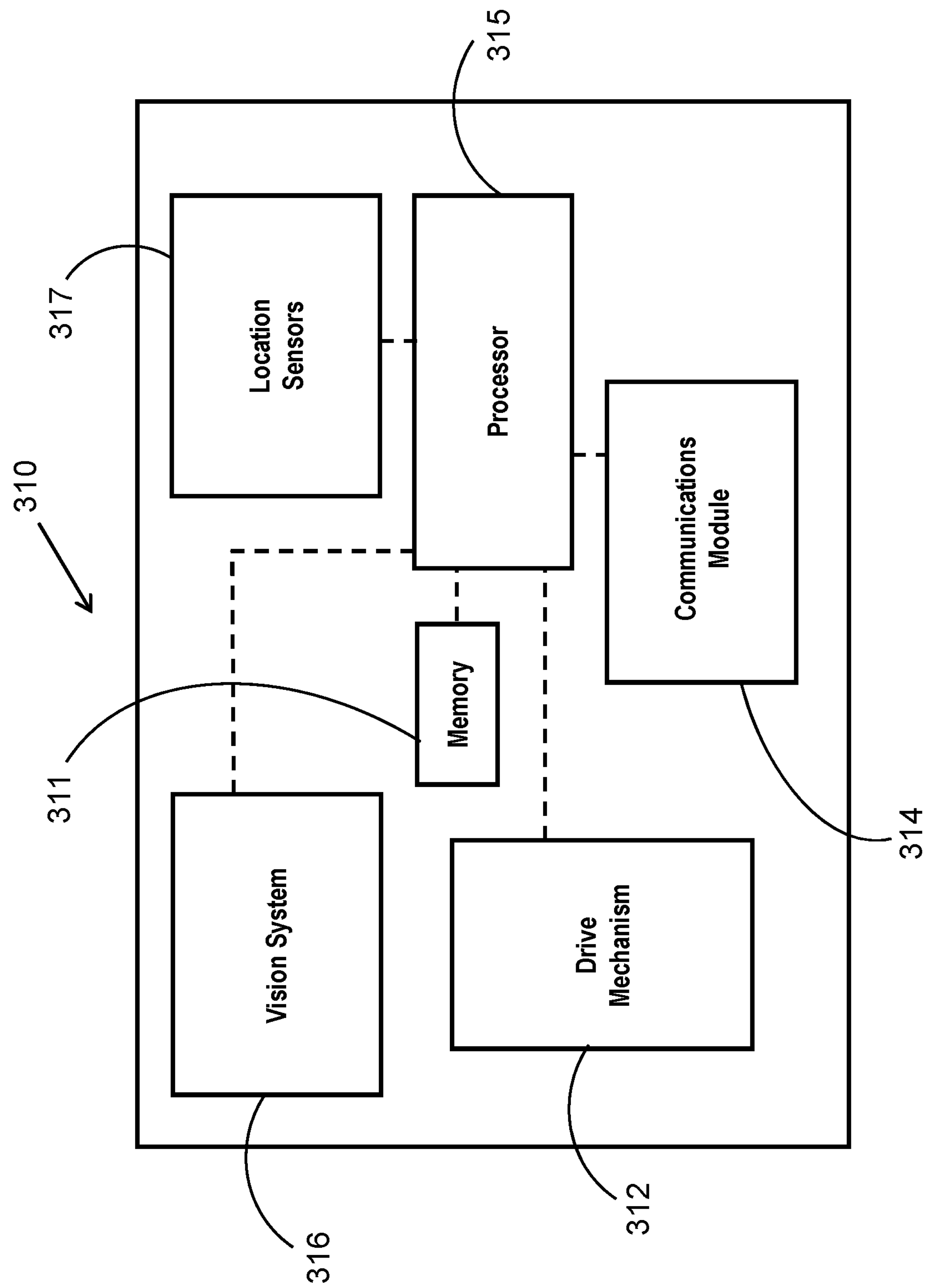
Figure 2E:
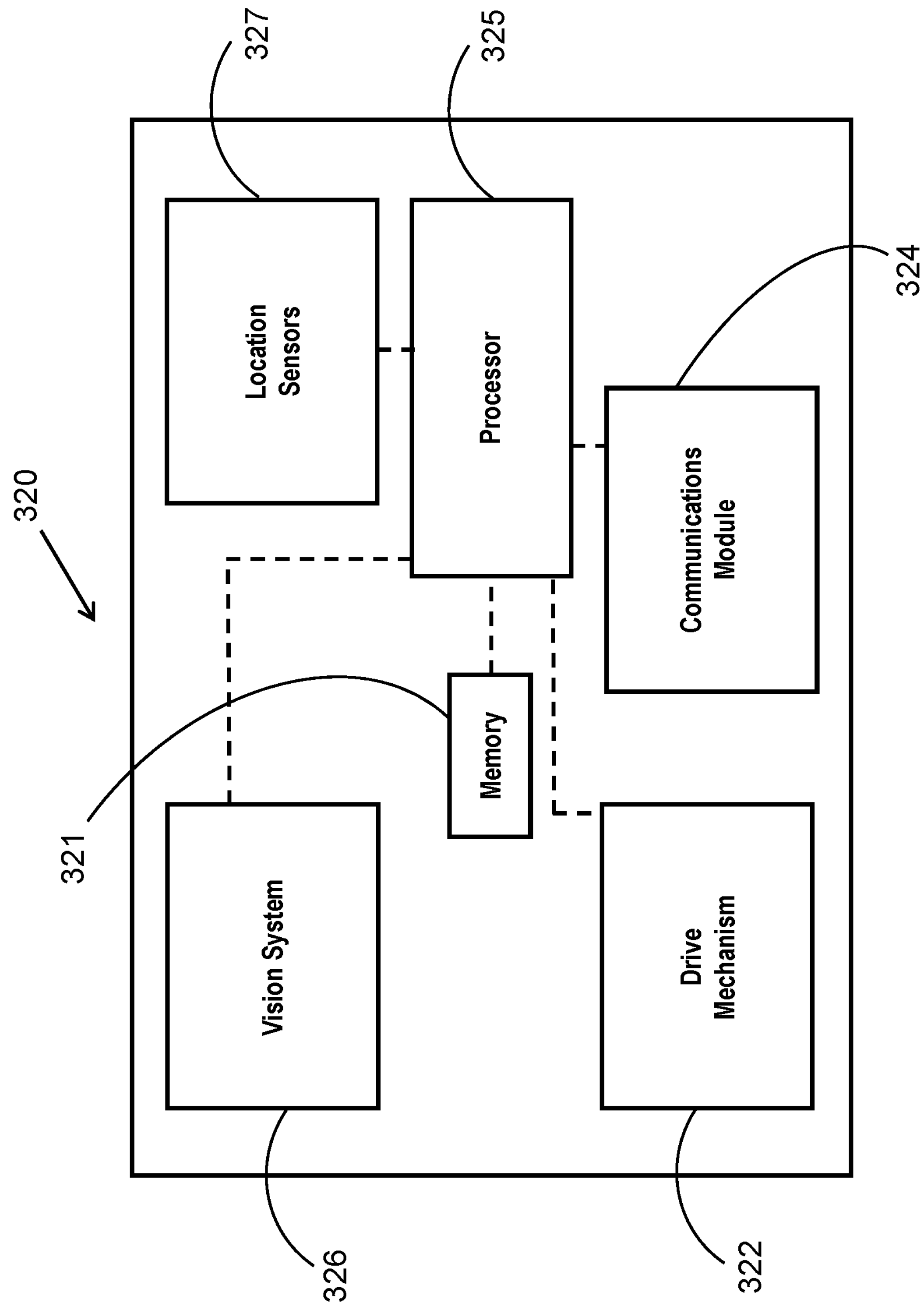

As mentioned and shown in FIG. 2A, the scanning device 110 is a robotic device that is configured to controllably travel within the inner confines of the pipe string 10 and travel to a specific location(s) within the pipe string 10 such as each girth weld 20. As a result, the scanning device 110 is capable of traveling internally within the pipe string 10 to different locations and then ultimately exit the pipe string 10. Since a pipe crawler by definition must be capable of traveling within the pipe string 10 in a controlled manner, the scanning device includes a drive mechanism 112 that allows the scanning device 110 to traverse and travel within the pipe string 10. The drive mechanism 112 can consist of any number of different conventional drive mechanisms and generally includes drive wheels or continuous tracks (tank treads) that surround drive wheels. One or more motors, such as an electric motor (e.g., DC servomotor) can be used and is connected to a power source, such as a battery, that powers the motor as well as other electronics contained onboard the scanning device 110. In this manner, the scanning device 110 can be driven to a precise location within the pipe string 10.

As mentioned above, one function of the scanning device 110 is to assess the condition within the pipe string 10 and more particularly, assess the condition of one or more girth welds 20. This functionality will first be described.

The scanning device 110 can thus be in the form of a multi-sensor platform that carries a variety of condition assessment tools inside the pipe string 10 in a single deployment and, as described herein, can also provide images and/or live video that can aid in detecting anomalies within the pipe string 10.

The scanning device 110 has the ability of measuring the depth of the weld beads in three dimensions (3D) and generate a profile of the girth weld 20 with high accuracy in order to detect sharp edges. This is achieved by a scanning tool that is capable of performing this function. More particularly, a 3D imaging device 115 can be provided and is configured to measure the dimensions of the weld both longitudinally and circumferentially. The 3D imaging device 115 can be either a depth camera, a 3D laser or even a 1D laser mounted on a traversing and tilting mechanism.

The scanning device 110 has a main (onboard) processor 125 (PCB) that is operatively connected to the 3D imaging device 115, as well as other sensors and electronics described herein. Once the weld profile is generated by the 3D imaging device 115, the processor 125 studies, filters, and compare the profile data to desired and acceptable profiles. The main processor 125 can be operatively connected to a communications module 129 that permits commands and data, images, video feeds, etc. to be communicated between the processor 125 and a main controller 130 that is typically located outside the pipe string 10 and can be part of a computing device that has a display on which the profile data, images, video feeds, etc. can be displayed. Memory 127 is provided as part of the scanning device 110.

For example, if the weld bead height exceeds a certain predefined value (e.g., 8 mm) and/or a sharp edge is detected (e.g., pointed edges of less than 0.2 mm), the onboard processor 125 generates the desired contour lines (a target profile) and then transmits the data wirelessly via the communications module 129. As described herein, this information is delivered to another unit (tool), such as a grinding (device) tool 140, described herein, that is configured to perform the intended operation in this case grinding of the weld bead to remove the undesired defects/artifacts. The grinding tool 140 like the scanning device 110 is capable of controlled travel within the pipe string 10 and can be a robotic device that includes a drive mechanism 142 which can comprise any number of different drive mechanisms configured to move the grinding tool 140 within the pipe string 10. For example, a motor and drive shaft can be connected to driven wheels or the like and be powered by a power source, such as a battery.

Like the scanning device 110 and other equipment described herein, the grinding tool 140 can communicate with other pieces of equipment. For example, the grinding tool 140 has a communications module 144 that permits a processor 145 of the grinding tool 140 to both receive and transmit commands, data, images, video feed, etc.

More specifically, the desired contour lines (target profile) transmitted by the onboard processor 125 to the grinding tool 140 permit the grinding tool 140 to have an exact path (grinding instructions) that is to be followed in order to rectify the weld and remove the undesired defects, etc., resulting in the removal of any sharp edges and any excess material found on the weld. The exact path (the grinding instructions) identifies the locations and amount of the weld bead material that is to be removed.

The grinding tool 140 is thus a separate device that can traverse the inside of the pipe string 10 independent of the scanning device 110; however, as described herein, the grinding tool 140 can receive its operating instructions from the onboard processor 125 of the scanning device 110 which, as described herein, generates a complete work plan for all of the various driven (robotic) devices including the grinding tool 140. Preferably, as mentioned, the work plan instructions and commands are delivered wirelessly from the scanning device 110 to each of the respective tools/units.

It will also be appreciated that the grinding tool 140 itself contains one or more grinding implements 143 (e.g., rotating grinding wheels, etc.) that are configured to grind the material of the weld bead.

The scanning device 110 can further be configured to detect the amount of rust that is accumulated on top of the girth weld 20 using a machine vision application 111 for application. As is known, machine vision is a technology and method used to provide imaging-based automatic inspection and analysis for such applications as automatic inspection, process control and robot guidance and in this case, the detection and analysis of the rust. For example, based on a stored data set of information, such as detection or imaging data or sensor measurements, etc., and the required time to remove the rust to achieve a rust free or acceptable surface, the machine vision application 111 can predict from the amount of rust observed at a given girth weld 20 and generate a remedial plan for removing such amount of rust. The amount of accumulated rust varies the time and amount of blasting and cleaning in order to make sure the desired anchor profile is reached (e.g., 100 μm). Thus, the processor and/or machine vision application is configured to calculate a work plan based on the initial estimated amount of rust at the site and based on the target end profile that is acceptable. Once the differences between the two amounts is calculated, then the application generates the work plan that includes the estimated amount of grinding time and cleaning that is required to achieve such objective of removing rust at the site until the target end profile is achieved.

As previously mentioned and disclosed in more detail below, one step of the present method is the coating of the weld joint and the coating amount is usually constant for all girth welds of the same diameter which can be programmed prior to starting the coating job knowing the exact diameter of the pipe to be coated (which can be measured using a laser module that can be part of the scanning device 110). Furthermore, after completion of each task (grinding, blasting, coating, inspection), the operator can be required to consent and approve the quality of the job based on a camera feed mounted on any of the operating tools (units). If more grinding, blasting, or coating is required, the operator can send commands manually to the designated units to grind, blast and coat further or repeat the inspection. The other tools that are mentioned above are described in detail herein.

The scanning device 110 is equipped with location sensors 119 or other technology to estimate the position of each girth weld 20 within the pipe string 10. For example, encoder wheels and accelerometer data can be fused together to roughly estimate the traveled distance from a reference point. For example, the reference point can be the launch point (e.g. entrance) into the pipe string 10. Based on encoders and/or accelerometers, the travel distance from the launch point (the reference point) can be calculated and in this way, location information for each of the girth welds 20 is calculated (i.e., a map of the girth weld locations is generated). This information is then used subsequently as part of the work plan commands that are delivered to other (robotic) devices (tools) that perform the operations discussed herein. Part of the work plan generation is calculating a travel distance that each robotic device must travel to the next weld joint.

Additionally, girth welds 20 can be used as landmarks to increase the position accuracy and reset encoder errors. Girth welds can also be autonomously detected by an onboard camera or proximity sensors. In other words, the processor can be configured with image recognition software such that the girth weld 20 is detected based on image recognition software and the precise location (coordinates) of the girth weld 20 are recorded and stored in memory. This stored information can then be used to control the positioning of the other tools and generate the work plans thereof which involves controlling movement and driving the respective tools to the girth weld location to allow these tools to perform operations on the girth weld 20. In other words, the location sensors 119 can be recalibrated using the image recognition software which identifies the precise location of the girth weld 20 when it is passed.

As described in more detail herein once all the girth welds 20 to be coated are scanned using the scanning device 110, the scanning device 110 generates a detailed work plan that assigns each of the robotic units (tools), described herein, to the designated girth weld 20 in a sequential timed manner as described below.

An exemplary simplified work plan that can be generated by the scanning device 110 is set forth below in Table 1:

TABLE 1

| Welds | Grinding | Surface Preparation | Coating | Inspection |
|---|---|---|---|---|
| Weld #1 | NA | Cleaning 9:15-9:18 | Coating 9:30-9:33 | Inspecting 10:00-10:15 |
| Weld #2 | Desired profile 9:35-9:40 | Cleaning 9:42-9:50 | Coating 10:05-9:08 | Inspecting 10:40-10:55 |
| Weld #N | NA | Cleaning 12:05-12:08 | Coating 12:25-12:28 | Inspecting 13:00-13:15 |

As set forth above, this simplified work plan involves a pipe string 10 that includes three or more girth welds, namely, welds #1, #2, and #N. The different operations (tasks) that form a part of the work plan can be as follows: grinding (if necessary); surface preparation of the girth weld; coating of the girth weld; and final inspection of the coated girth weld. The times listed in each box is the time of a sample day when the given task is to be performed and the total time allocated for any given task is represented by the difference between the start time and end time. For example, for weld #1, no grinding is required and the first assigned operation (task) is that at 9:15, surface preparation is to be initiated and last until 9:18 meaning that the girth weld 20 will undergo 3 minutes of surface preparation. Next, beginning at 9:30, the weld #1 is coated and the coating process ends at 9:33 (again 3 minutes of work time). Inspection of weld #1 begins at 10:00 and ends at 10:15 meaning that over 15 minutes a thorough inspection of the recently coated girth weld 20 is performed. The work plans for welds #2, #3 and #N are set forth above in a similar manner.

As discussed in more detail below, since the pipe string 10 is a linear structure for the most part, the various robotic tools are introduced to form a series of independently movable robotic tools but the work plan must be configured such that it does not require one robotic tool to pass another robotic tool to reach a given girth weld to perform a given operation (task) since that is not physically possible inside of a pipe string 10. The robotic tools cannot overtake and pass another robotic tool within the confines of the pipe string 10.

It will be appreciated, as previously mentioned, that the onboard processor 115 of the scanning unit 110 performs the following functions/operations: controls not only the motion (driving) of the scanning device 110; measures weld profile(s); generates a target (desired) weld profile (if needed to rectify the weld); and generates the work plan for all other robotic units (tools) to follow and assigns the tasks to each unit (tool) individually.

As described herein, since the scanning device 110 generates the work plan for all other modules and tools (robotic units), the scanning device 110 acts as a dominant mind (master brain) to keep track of the progress of the tasks (which can include location of the tools) and is configured to update the work plan accordingly. The scanning device 110 thus relays the task assignments and details to designated tools (units) as the scanning device 110 communicates wirelessly with each one of the tools. It also communicates with the master controller 130 at the operator side (external to pipe string 10) to update the progress of the tasks being performed by the tools and acquiring operator feedback and/or commands, such as operator acquiescence/consents.

While described in more detail herein, it will be understood that any or all of the other modules/robotic tools (units) besides the scanning device 110 can include one or more (e.g., preferably all) of the following features: (a) a controller (board/PCB) that controls all of the motors and actuators on the unit as well as collect data from onboard sensors, instruments, etc., (b) communication device or module (e.g., WIFI) to wirelessly communicate with the master controller 130 as well as the other units including the scanning device 110, (c) driving mechanism (e.g., wheels and motors), (d) vision system: a camera or more with weld recognition and distance estimate (e.g., using machine language); and (e) a localization mechanism: such as encoders and accelerometers for more accurate relative displacement of the robotic device.

Figure 3:
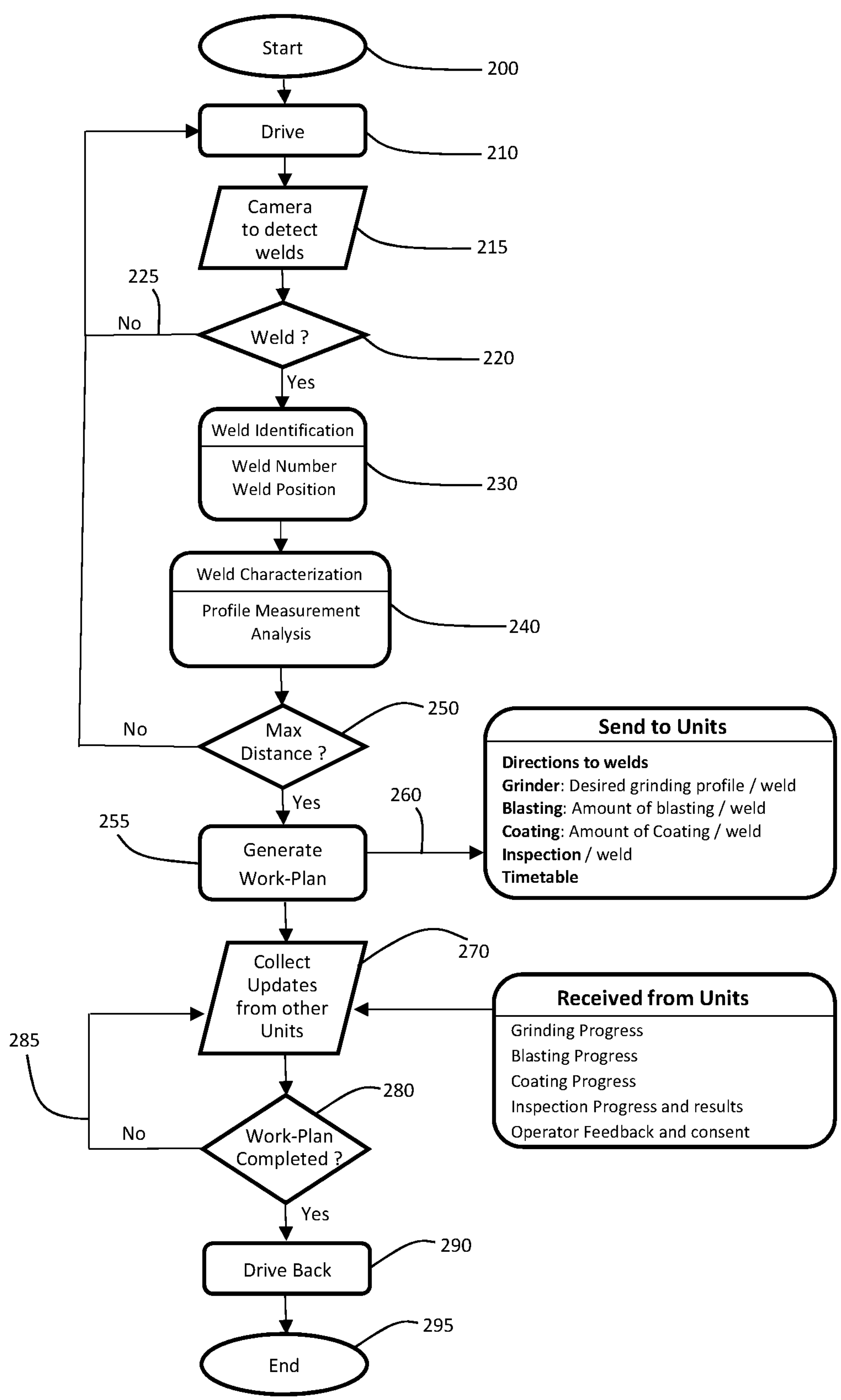
FIG. 3 is a flow diagram illustrating a routine for coordinating and executing specific tasks required to complete the inspection and coating of field girth welds inside pipes using in-pipe robotic devices (crawlers)
Figure 4:
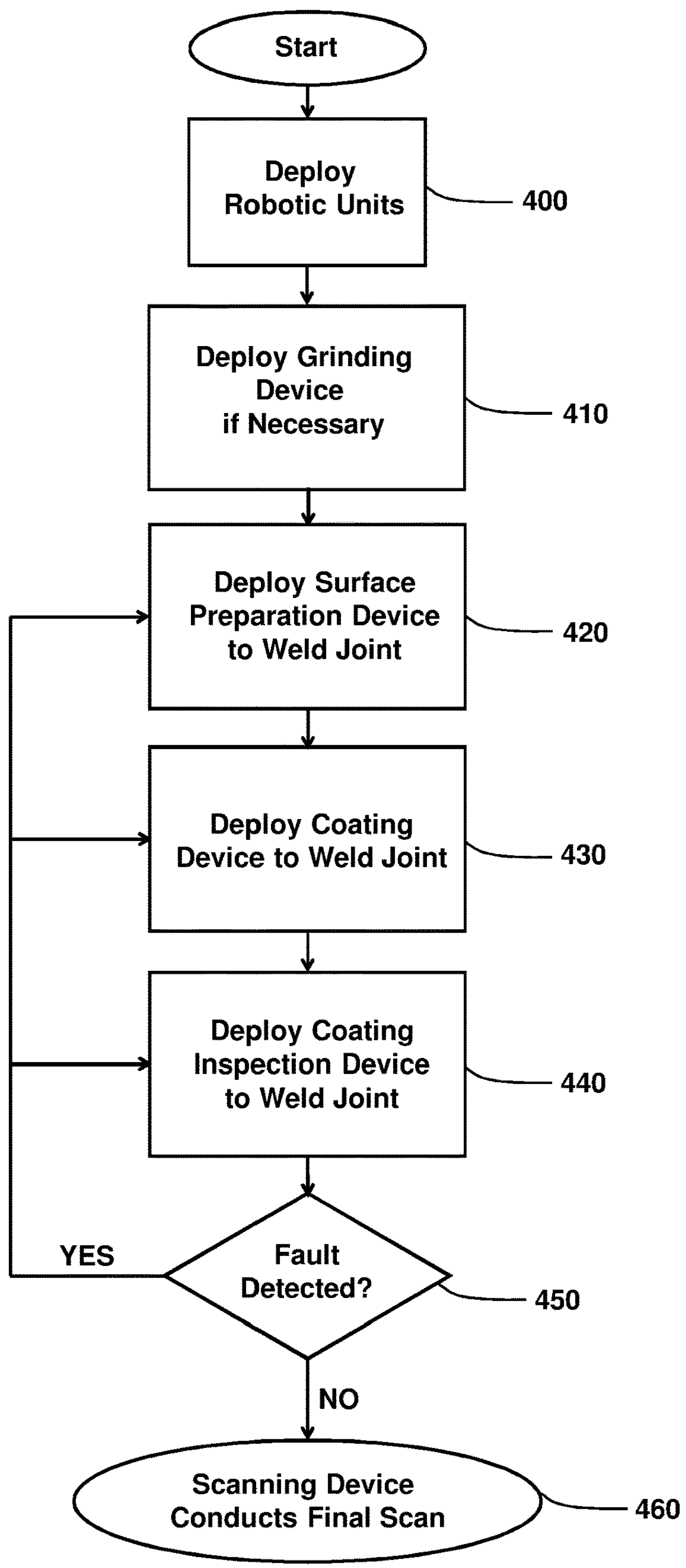
FIG. 4 is an additional flow diagram illustrating an additional subroutine for executing specific tasks required to complete the inspection and coating of field girth welds inside pipes using in-pipe robotic devices (crawlers)

FIGS. 3-4 sets forth a pair of flowcharts illustrating the various tasks, according to at least one implementation, that are performed by the scanning device 110 and other robotic devices of the system. FIG. 5 illustrates one exemplary pipe string 10 in which six (6) pipe sections are shown joined together to form the pipe string 10. At the location at which ends of adjacent pipe sections are joined, a weld join (girth weld) 20 is formed and is shown. For ease of discussion, the leftmost pipe section can be labeled as a first pipe section, while the rightmost pipe section can be labeled as the last (sixth) pipe section. The first pipe section is also considered to be the launch side of the pipe string 10 in that the present system 100 and in particular, the various independent tools thereof, are loaded into the pipe string 10. The initial travel direction of the system 100 is from left to right in the pipe string 10 of FIG. 5. It will be appreciated that a typical pipe string 10 is much longer than six pipe sections and can be hundreds of meters in length.

The main method (routine or process) begins at step 200. At a first step 210, the scanning device 110 is deployed at a launching site 30 of the pipe string 10 (which is one end of the pipe string 10) and is driven all the way towards the furthest (deepest) end of the pipe string 10. The location of the scanning device 10 can be continuously monitored by the master controller 130 and can be displayed on a screen viewed by the operator. The driving and locating sensing technology 112, 119 that is employed is described hereinbefore. As the scanning unit 110 drives, the scanning unit 110, it scans the girth welds 20 one by one, as described below, until the scanning device 110 finishes scanning the last girth weld 20 in the pipe string 10 and parks in the last pipe section of the pipe string 10. FIG. 6 illustrates to the far right of the figure the last girth weld 20 and the last pipe section in which the scanning unit 110 parks (i.e., the scanning device 110 parks to the right of the last girth weld 20 in FIG. 6).

As mentioned previously, one of the functions of the scanning device 110 is to scan the girth weld 20 to allow for inspection thereof. The scanning device 110 can thus include a scanning module 113 that can be configured to: perform a low resolution scan of the interior surface of the pipe string 10 to detect any major defects; and perform a high resolution scan to detect sharp edges and weld splatter at each weld joint (girth weld 20). Conventional weld joint scanning equipment can be used. This step is identified as step 215 in FIG. 3. The detection of the girth weld 20 is performed at step 220 using the scanning module (machine vision) 111 which can be in the form of one or more imaging devices, such as cameras. In the event that a weld is not detected, the process loops back at step 225 to step 210 and the scanning device 110 is further driven a distance in an effect to detect one or more weld joints. The distance can be set in view of the known length of the pipe sections. In the event that a weld is detected at step 220, then the process continues to step 230 which is a weld identification step. In particular, at this step, the detected weld is labeled with unique weld identification information, such as a weld number (for a given uniquely identified pipe string 10) and a weld position (which can include coordinates of the weld within the pipe string 10 and can be based on the detected distance that the scanning device 110 has traveled since the reference point (e.g., the launching site).

Once the girth weld 20 is identified, the next step is step 240 which is a weld characterization step. As previously mentioned, the weld characterization step can be a step in which a weld profile measurement analysis is performed and more particularly, the scanning device 110 measures the profile (3D profile) of each weld bead at the girth weld 20. If during the weld characterization step 240, it is determined that the measured profile lies outside acceptable parameters (differences between the measured profile and the target profile if one or more portions fall outside an acceptable range), then a subsequent grinding step is required for this particular girth weld 20 and the following steps are performed: the desired weld bead shape (target profile) is generated as contour lines and an autonomous grinding code is generated for the grinding tool 140 (FIG. 2) to shape the weld bead as required. The generated grinding code is timely stamped. Thus, the grinding tool 140 is provided with not only the girth weld location (unique girth weld identification) but also is provided the grinding code (based on the target profile) which in effect provides detailed grinding instructions on how to grind and reshape the girth weld 20. As mentioned, the grinding tool 140 (FIG. 2) can be a robotic tool that drives within the inside of the pipe string 10 to the identified girth weld location. The grinding tool 140 can include a vision system 141 that allows the progress of the grinding operation to be monitored. The vision system 141 can be identical and/or similar to those described herein. The grinding tool 140 also includes memory 149.

At step 250, the scanning device 110 determines whether a maximum distance (inputted max distance) has been reached. In other words, the scanning device 110 can be inputted with a maximum travel distance value that relates to the expected travel distance within the pipe string 10 that will allow the scanning device 110 to pass all of the target girth welds 20 so as to allow the identification and tagging of all of the target girth welds 20. At step 250, if it is determined that the scanning device 110 has not traveled the maximum distance (i.e., the distance within the pipe string 10 to at least the parking location within the last pipe section), then the scanning device 110 continues driving within the pipe string 10 since additional girth welds may be downstream for identification (tagging)/scanning.

If instead at step 250, it is determined that the scanning device 110 has in fact traveled the maximum (inputted) distance, then at step 260 a work plan is generated by the scanning device 110. More particularly and as described herein, as the scanning device 110 scans the weld joints (girth welds 20), it develops a work plan for each weld joint listing all types of functions (operations) needed and the estimated time to complete all functions (operations), such as grinding, surface preparation, coating and coating inspection. When generating the work plan, the scanning device 110 takes into consideration a number of factors (parameters) including, but not limited to, (1) the time needed for the respective function unit (one of the tools mentioned herein, such as the surface preparation device 300, the coating device 310, the inspection device 320, etc.) to perform the operation (job) and also the time to drive (travel time) to the weld joint which will take into account not only the distance required to be traveled but also the drive speed of the particular tool since the various tools (devices) that are used typically have different drive speeds (e.g., the drive speed of the coating device 310 may be different than the drive speed of the inspection device 320). As described in detail herein, the tools are loaded into the pipe string 10 in series and, as mentioned, one tool (robotic device) cannot "jump" over the other tools and therefore, the tools are introduced (launched) into the pipe string 10 in a specific order. In addition, in the event that one girth weld 20 does not require one operation, the respective tool that performs that operation can then effectively skip that weld joint and proceed to the next one but the other tools will need to operate on this skipped weld joint and thus, this entire work flow scheme is calculated by the processor to achieve the optimal use of the resources.

The grinding time varies proportionally to the amount of grinding required. Also, the blasting amount can be estimated depending on how much rust accumulated on the girth weld 20. Moreover, the coating amount can be determined by the operator depending on how much of the coating thickness is desired for the girth welds 20. Moreover, the coating amount can be determined by the operator depending on how much coating thickness is desired for the girth welds 20. Usually, the coating amount is constant for similar sized girth welds. Thus, the processor 125 of the scanning device 110 can calculate this amount based on the previously inputted pipe string data including the dimensions of the pipe string 10, including the dimensions of the girth weld 20.

Table 1 disclosed herein shows an exemplary work plan which indicates for each uniquely identified weld girth 20 the types of tasks that need to be performed and the time allocated for performing each specific operation.

Once the work plan is generated at step 255, the scanning device 110 then deploys, at step 400 (of the subroutine of FIG. 4) the robotic units (tools) in order until they pass the last girth weld 20 in the pipe string 10 and park within the last pipe section behind the scanning device 110. FIG. 6 shows one exemplary deployment scheme in which the robotic tools include, but are not limited to, the surface preparation device (unit) 300, the coating device (unit) 310, the inspection device (unit) 320, and of course, the scanning device 110.

As previously mentioned and as shown in FIG. 2, the surface preparation device 300 can include one or more of the following: a) a controller 305 (board/PCB) that controls all of the motors and actuators on the unit as well as collect data from onboard sensors, instruments, etc., (b) communication device or module 304 (e.g., WIFI) to wirelessly communicate with the master controller 130 as well as the other units including the scanning device 110, (c) driving mechanism (e.g., wheels and motors) 302, (d) vision system 306: a camera or more with weld recognition and distance estimate (e.g., using machine language); and (e) localization mechanism 307: such as encoders and accelerometers for more accurate relative displacement.

Similarly, the coating device 310 can include one or more of the following: a) a controller 315 (board/PCB) that controls all of the motors and actuators on the unit as well as collect data from onboard sensors, instruments, etc., (b) communication device or module 314 (e.g., WIFI) to wirelessly communicate with the master controller 130 as well as the other units including the scanning device 110, (c) driving mechanism (e.g., wheels and motors) 312, (d) vision system 316: a camera or more with weld recognition and distance estimate (e.g., using machine language); and (e) localization mechanism 317: such as encoders and accelerometers for more accurate relative displacement. Memory 311 can also be provided.

Similarly, the coating inspection device 320 can include one or more of the following: a) a controller 325 (board/PCB) that controls all of the motors and actuators on the unit as well as collect data from onboard sensors, instruments, etc., (b) communication device or module 324 (e.g., WIFI) to wirelessly communicate with the master controller 130 as well as the other units including the scanning device 110, (c) driving mechanism (e.g., wheels and motors) 322, (d) vision system 326: a camera or more with weld recognition and distance estimate (e.g., using machine language); and (e) localization mechanism 327: such as encoders and accelerometers for more accurate relative displacement. Memory 321 can also be provided.

As shown in FIG. 6, the scanning device 110 is the rightmost device in the pipe string 10 meaning that it is at the furthest (deepest) location from the launching site at the other end of the pipe string 10, the inspection device 320 is at the second furthest (deepest) location, the coating device 310 is at the third furthest (deepest) location, and the surface preparation device 300 is closest to the launching site (shallowest) relative to the other robotic devices. In any event, as shown, all of the devices 300, 310, 320, 110 are parked beyond the last weld joint which allows each of the devices to be driven in a direction toward the launching site to reach the last weld joint, thereby allows all of the devices to travel in series without “jumping” over each other. The movement of each of the devices 300, 310, 320, 110 is in a direction toward the launching site (which after completion of all of the operations in fact represents an exit).

Step 260 shows the delivery of work plan details (instructions) to each of the robotic devices, e.g., a grinding device (grinder) (not shown), the surface preparation device 300, the coating device 310, and the inspection device 320. For example and as described in more detail herein, the work plan details for the grinding device can be in the form of a desired (target) grinding profile for a given girth weld, the work plan details for the surface preparation device can include the amount of blasting for a given girth weld, the work plan details for the coating device can include the amount of coating (and application pattern) for a given girth weld, and the work plan details for the inspection device 320 includes an inspection timetable.

These work plan details are sent from the scanning device 110, which again represents the main processor of the system 100 (the robotic crawler formed of the various different devices), to the various robotic devices.

At step 410, in the event that the scanning device 110 identifies that for any one of the scanned girth welds 20 grinding/repair work is needed to be performed by the grinding device, then the grinding device is deployed inside the pipe string 10 to be positioned at the deepest joint that requires grinding. As discussed earlier, the grinding device has previously received the time stamped grinding code that provides the precise operation protocol/commands that are followed by the grinding device. The grinding device 140 thus applies grinding autonomously following the time stamped generated grinding code. Once the grinding operation is completed, the weld bead surface is then polished (post-grinding polishing). Visual feedback using the vision (imaging) system 141 is preferably available to confirm that the grinding device is following the desired contour (based on the grinding commands sent to the grinding device). Once the grinding operation is complete, a 360 degree visual inspection is performed using the onboard camera (that is part of the onboard vision system) or by using a scanner. The image files or image feed from the grinding device 140 is delivered to the processor of the scanning device 110 and/or the master controller 130 that is outside the pipe string 10.

After completing the grinding work on one weld joint (girth weld 20), the grinding device is then driven to the next joint weld that requires grinding and the above operations are performed again (based on the unique time stamped grinding code). In the event that there are no other joint welds that require grinding, the grinding device is then retrieved from the pipe string 10. It will also be appreciated that the vision system 141 that is part of the grinding device 140 allows for operator to monitor the camera feed (video feed) and in the event that the operator believes that additional grinding would be beneficial, the operator can manually command and control the grinding device so that additional grinding is performed. Thus, operator intervention is possible and the onboard controller of the grinding device allows operator control over the tool implements (grinding implement, etc.).

In FIG. 3, the step 270 comprises updates from the various robotic devices (tools) being delivered to the processor of the scanning device 110 and/or the master controller. For example, the grinding progress from the grinding device is delivered, the blasting progress from the surface preparation device 300 is delivered, the coating progress from the coating device 310 is delivered, the progress and results from the inspection device 320 is delivered and operator feedback and consent are delivered from the operator.

The operations performed by the specific robotic devices (tools) are now described with reference to each robotic device (tool) and with reference to the flow chart of FIG. 4.

Once all of the robotic devices (tools) (e.g., the devices 300, 310, 320) are parked in the last pipe section beyond the last weld joint (FIG. 6), the surface preparation device 300 which is the last unit in the chain and the one closest to the launching site crawls (moves/drives) back to the last weld joint (girth weld 20) and begins execution of the work plan and in particular, begins the surface roughening process which is identified as step 420. The surface preparation device 300 positions itself relative to the given girth weld such that the roughening tool (or other implement) is on top of the area of interest. The surface preparation device 300 then begins applying surface roughening using grit blasting or a mechanical brush or any other method that meets the requirement. The surface roughening should remove flash rust and generate anchor profile suitable for the coating. The amount of blasting should be estimated by the scanning device 110. If more blasting is needed, the operator can increment the blasting time (using the camera feed and by manual operator commands/inputs).

In addition, the surface preparation device 300 can include a vacuum component 309 that acts to remove the debris that is generated from the surface preparation step.

As with the other robotic devices, the surface preparation device 300 can include memory 301.

The visual feedback provided by the vision system is provided to the operator to supervise the process.

As shown in the work plan of FIG. 4, after the surface preparation device 300 completes the work task (e.g., surface roughening and vacuuming, etc.), the surface preparation device 300 then crawls (moves) back toward the launching site to the next weld joint and then repeats the above steps to prepare the surface (surface roughening) of this next weld joint. This process continues to be repeated with the surface preparation device 300 moving backward toward the launching site until each of the weld joints are operated on (e.g., applying surface roughness) by the surface preparation device 300 and then once all weld joints have been operated on, the surface preparation device 300 exits the pipe string 10 from the launching side and finishes roughening the first weld joint in the pipe string 10.

The exemplary work plan shown in Table 1 thus sets forth that the surface preparation device 300 incrementally, yet progressively, travels toward the launching side from its initial parked position beyond the deepest girth weld 20 and as mentioned herein, the schedule for the surface preparation device 300 gives both an arrival time at each given girth weld 20 and an exit time, with the elapsed time between these two events reflecting the operating time of the surface preparation device 300 at any given girth weld 20.

The coating device 310 operates in a similar manner and based on the work plan transmitted from the scanning device 110 to the coating device 310. Step 430 relates to the operation of the coating device 310 and in particular, to the coating of the weld joint. Thus, once the surface roughening device 300 completes the task on the deepest girth weld and begins travel to the next girth weld 20, the coating device 310 crawls back toward and to the deepest girth weld 20 to begin the weld coating operation.

More specifically, the coating device 310 crosses the deepest weld joint and positions itself such that a coating nozzle 311 that is at the end of the coating device 310 is on top of the area of interest (i.e., the area to be coated). The coating device 310 is configured to apply the coating as a spray (to form a spray coating). The coating can be any number of traditional weld joint coatings and can, for example, be an FBE (fusion bonded epoxy) coating that requires heating to bond while liquid epoxy requires mixing of two agents to cure the compound. As mentioned, the coating amount is generally constant with all girth welds of the same diameter and this information (diameter value) is input into the processor of the scanning device 110 as part of the calculation of the work plan for the coating device 310 and in particular, the operating on (spray) time and residence time of the nozzle over a given area of the weld are part of the spray recipe (commands) that is transmitted to the coating device 310.

Visual feedback of the progress of the spray coating is achieved with the vision system onboard the coating device 310. This visual feedback allows the operator to supervise the progress. In the event that more coating is required, the operator can increment the time of the coating (i.e., the spay time).

After applying the coating, the coating device 310 crawls back to the previous weld joint (the next one toward the launching site) and then repeats the coating process described above for each girth weld 20 until the coating device 310 exits the pipe string 10 at the launching side and finishes coating the first weld joint (i.e., the weld joint that is closest to the launching site).

The work plan is also calculated with the cure time of the coating in mind since the work plan must ensure that no cables, wheels or other parts of any of the robotic devices, especially the coating inspection device 320, that immediately follows the coating device 310, touch the coated surface until it fully cures. This cure time is thus part of and incorporated into the work plan.

Once the coating that is sprayed on the deepest weld joint has cured, the coating inspection device 320 crawls back in the direction toward the launching side until the coating inspection device 320 reaches the cured coating at the deepest weld joint and begins the coating inspection process. This step is identified as step 440. One exemplary coating inspection device 320 comprises a holiday testing device 321, a dry film thickness probe 322 and a camera (vision system) 323; however, it will be understood that the coating inspection device 320 can include additional and/or different instruments that are configured to ensure the integrity of the coating at the weld joint by inspection thereof.

The coating inspection device 320 crawls and positions itself over the last weld joint (deepest weld joint) to inspect the coating applied thereto. The coating inspection device 320 performs its inspection of the coating and transmits the data to the operator and the scanning device 110. As mentioned, any number of conventional coating inspection techniques can be implemented including conducting a holiday test, measuring the coating thickness and procuring visual images (e.g., images and/or video feed).

As is known, a holiday test or continuity test is one of the non-destructive test method applied on protective coatings to detect unacceptable discontinuities such as pinholes and voids. The test involves checking of an electric circuit to see if current flows to complete the electrical circuit. The dry film thickness probe is configured to measure the thickness of the coating.

Since the operator can view images and/or a video feed from the camera and other components of the vision system, the operator can choose to repeat the inspection process if deemed necessary.

Once the coating is fully inspected, the coating inspection device 320 then crawls back to the previous weld joint and the above-described coating inspection steps are performed on the previous weld joint. The coating inspection device 320 continues inspecting each weld joint until the coating inspection device 320 exits the pipe string 10 at the launching side and has finished inspecting the first weld joint.

In the event that a coating cavity, pinhole, scratch or any anomaly is detected by the inspection technologies, the joint number and exact location of the anomaly is recorded for further rectification. Once again, this information is also transmitted from the coating inspection device 320 to the processor of the scanning device 110 and/or the master controller and the operator.

Once the inspection of all weld joints is completed and if a fault is detected in one of the weld joints or more, then one or more of the following steps are taken: (1) deploy and drive the coating inspection device 320 until it passes the first faulty joint (deepest faulty joint) and leaves a space for the next robotic devices (tools); (2) deploy the coating device 310 and drive it pass the first faulty joint as well; (3) if needed, deploy the surface preparation device 300 as well and drive it to the first faulty joint. These steps are characterized as step 450. Then once the necessary robotic devices (tools) are in the proper locations, each of the necessary robotic devices then performs its subroutine in that the surface preparation device 300 performs the operations (tasks) described above at step 420; coating device 310 performs the operations (tasks) described above at step 430; the coating inspection device 320 performs the operations (tasks) described above at step 440; and the redeployment step (step 450) described in this paragraph may needed to be performed again.

Once all of the weld joints (girth welds 20) in the pipe string 10 pass inspection, the scanning device 110 checks the work plan at step 280 of FIG. 3 and starts crawling back to the launching point (it drives from the deepest weld joint to the launching point (at the launching side) and while scanning the girth welds 20 for a final checkup (final inspection). This step is identified as step 460 in FIG. 4. As shown in FIG. 3, if the work plan is not completed at step 285, the scanning device 110 continues to collected updates from the robotic devices (step 270) until the work plan is determined to be completed at step 290. The process ends at step 295.

Time Estimation

As mentioned, the scanning device 110 is configured to estimate the time needed to complete the steps that are described herein with the exception of the last described redeployment step in which if a fault is detected, the necessary robotic devices are redeployed and this deployment step can be accounted for as an error estimate proportionally related to the number of weld joints (girth welds 20).

The following is an example of how the scanning device 110 can estimate (calculate) the time needed for each of the operating steps described herein.

For step 210, the driving time requires for the scanning device 110 is calculated as being equal to the pipe length multiplied by the number of pipes divided by the speed of the scanning device 110. In other words: step 220 time=pipe length (m)×number of pipes/speed of the scanning device (m/s). As mentioned, a typical pipe length is 12 m.

For steps 215-250, the time is estimated to being equal to the time required to scan a single weld joint 20 (e.g., in seconds)×number of weld joints 20 in the pipe string 10. In other words, t=(time to scan single weld joint)*(number of weld joints).

For step 400, the time is estimated as being equal to the pipe length multiplied by the number of pipes divided by the speed of the slowest robotic device (crawler). In other words, the estimated time=pipe length (m)×number of pipes/speed of the slowest robotic device (m/s). Typically, the slowest robotic device is the coating device and the surface preparation device.

For step 410 (grinding repair), the estimated time=2×[pipe length (m)×weld number (furthest weld that needs grinding)/speed of the grinding device (m/s)+Σ time required to grind each girth weld (s).

For step 420, the estimated time is equal to [pipe length (m)×number of pipes/speed of the surface preparation device (m/s)+Σ time required to surface prepare each girth weld (s).

For step 430, the estimated time will be done in parallel with the surface preparation, It is expected that the surface preparation time will be longer than the coating time per each weld. One can assume that the time for step 430 is only the time it takes for the coating device to travel to one pipe/section (e.g., 12 m) and perform coating on a single joint.

For step 440, step 440 only starts when the coating is cured (x seconds). Since the joint inspection is also faster than the previous two steps, one can assume that the time for this step 440 in seconds (s) is equal to X (s)+[pipe length (m)/speed of the inspection device (m/s)]+time to inspect one weld joint.

For step 450, this step is more of a safety factor that should be considered. As a result, the processor of the scanning device 110 can be configured to calculate and add a time buffer (safety buffer) that is proportional to the number of weld joints to account for any failed coated joints.

The total time for performing all of the steps described herein is equal to the summation of the step times+estimation time for handing units deployment and operator checks and confirmation.

Features of System 100

The system 100 can have one more of the following additional features:

1) the process is started by launching the scanning device 110 inside the pipe string 10 to assess the condition of the weld joint 20 and calculate the time and location for each of the robotic devices (tools);
2) following the generated work plan (mission table) generated by the scanning device 110, the other robotic devices (tools) are launched into the pipe string 10 all together as a string of independent crawlers having the following order from first to enter to the last to enter: inspection, coating, surface preparation and grinding device (if necessary);
3) after all of the robotic devices are stationed inside the last pipe section, the various individual operations are begun starting with the surface preparation then coating and then coating inspection for all weld joints starting from the last (deepest) weld joint;
4) if there is a coating defect detected by the inspection device, then the three main devices (units or modules), namely, the coating inspection device, the coating device and the surface preparation device) can be deployed again to mitigate the defect;
5) by coordinating with the other function units (the other robotic devices), the master control unit can compare the current mission progress (e.g., the location of each functional unit) with the estimated mission (work plan) timetable and if necessary, generate a corrected estimation of timing for each subtask; and 6) the scanning device 110 can be integrated with the coating inspection device 320 as well since they are usually deployed consecutively (i.e., the scanning device 110 and the coating inspection device 320 can comprise the same single robotic device (unit)

It will be appreciated that the operator can review all of the data/measurements and images and video feeds from a particular mission (work plan) as by using a display on which the data transmitted from each of the robotic devices (units) is displayed along with the static images and/or video clips and/or live video feed from any or all of the robotic devices can be viewed. This allows the operator to always be able to monitor the progress of the present process and also in the event that user intervention is required, such as confirmation of a task completion as by viewing the data, the user can make an informed decision by reviewing the wealth of information available on the display.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A system for performing multiple operations on one or more weld joints of a pipe string comprising:

a robotic scanning device that is configured to controllably travel inside of the pipe string and detect, scan and uniquely identify each weld joint within the pipe string;

a plurality of secondary robotic devices that are each configured to controllably travel inside of the pipe string and perform one or more specific operations on the one or more weld joints of the pipe string;

wherein the robotic scanning device includes a processor that is configured to generate a work plan for the plurality of secondary robotic devices, the robotic scanning device transmitting work plan commands to each of the plurality of secondary robotic devices and receive transmissions from the plurality of secondary robotic devices;

wherein the work plan includes for one or more of the secondary robotic devices: (1) a start time for each of the one or more secondary robotic devices at one or more of the uniquely identified weld joints of the pipe string; and (2) an estimated time needed for each of the one or more secondary robotic devices to perform the one or more specific operations on the respective uniquely identified weld joint.

2. The system of claim 1, wherein the scanning device includes: (1) a drive mechanism for controllable driving the scanning device within the inside of the pipe string; (2) a scanning module that is configured to: perform a low resolution scan of each weld joint to detect defects thereof; and perform a high resolution scan to detect sharp edges and weld splatter at each weld joint; and (3) a 3D imaging device that is configured to measure dimensions of each weld joint both longitudinally and circumferentially.

3. The system of claim 2, wherein the 3D imaging device comprises one of a depth camera, a 3D laser and a 1D laser.

4. The system of claim 2, wherein the 3D imaging device generates a weld profile for each weld joint and the processor is configured to compare the generated weld profile to a target profile for the weld joint and in the event that the generated weld profile lies outside acceptable boundaries of the target profile, the processor generates instructions for removing material from the weld joint.

5. The system of claim 4, wherein the instructions comprise contour lines indicating areas of the weld joint that are required to be removed in order for the weld joint to assume the target profile.

6. The system of claim 5, wherein the processor calculates whether a weld bead height of the weld joint exceeds an inputted maximum value and/or whether the weld joint has one or more pointed edges and if at least one of these conditions exists, the processor generates the contour lines relative to the generated weld profile.

7. The system of claim 1, wherein the scanning device includes a machine vision application that is configured to detect an amount of rust accumulated on top of each weld joint and generate a remedial plan for removing the rust.

8. The system of claim 1, wherein the scanning device includes one or more location sensors that are configured in combination with the processor to calculate a position of each weld joint, wherein the one or more locations sensors comprise at least one encoder wheel and an accelerometer.

9. The system of claim 8, wherein the scanning device has a recalibration application in which the calculated positions of each weld joint generated by the one or more location sensors can be recalibrated with data obtained from an image recognition application that is configured to detect and record precise coordinates of the weld joint based on the image recognition application that includes one or more onboard cameras for visually detecting each weld joint as the scanning device travels inside the pipe string.

10. The system of claim 8, wherein the processor is configured to determine whether the scanning device has traveled an inputted maximum distance within the pipe string which is a distance at which all of the weld joints would be encountered by the scanning device as it travels inside the pipe string and if the processor determines that the inputted maximum distance has been traveled by the scanning device, the scanning device stops further travel and then generates the work plan for the plurality of secondary robotic devices.

11. The system of claim 1, wherein the plurality of secondary robotic devices comprises: a surface preparation device, a coating device and a coating inspection device that are introduced into a launching end of the pipe string in the following order: scanning device, coating inspection device, coating device, and the surface preparation device.

12. The system of claim 1, wherein the plurality of secondary robotic devices transmit progress updates to the scanning device and the processor of the scanning device is configured to alter the work plan of one or more of the secondary robotic devices based on the progress updated received from one or more of the secondary robotic devices.

13. The system of claim 11, wherein each of the coating inspection device, the coating device and the surface preparation device includes: a processor; a communications module, a driving mechanism, a vision system, and one or more location sensors.

14. The system of claim 11, wherein the processor of the scanning device is configured to calculate a start position and instruct each of the coating inspection device, the coating device and the surface preparation device to assume a start position in which all of the plurality of secondary robotic devices and the scanning device are all located beyond a deepest weld joint that is being operated on.

15. The system of claim 1, wherein when the scanning device generates the work plan for the plurality of secondary robotic devices for each respective weld joint, the processor calculates a distance to be traveled by each of the secondary robotic devices from a start location to the next respective weld joint and a drive speed of each of the secondary robotic devices.

16. The system of claim 11, wherein the one or more weld joints includes at least a first weld joint, a second weld joint, and a third weld joint and wherein within the work plan the first weld joint comprising a deepest weld joint to be operated on, the second weld joint comprising a second deepest weld joint to be operated and the third weld joint comprises a third deepest weld joint to be operated on, wherein each of the surface preparation device, the coating device and the coating inspection device works in succession on the first weld joint, then the second weld joint and then the third weld joint.

17. The system of claim 16, wherein the work plan further takes into consideration a cure time of a coating that is applied to each of the first, second and third weld joints, in succession, by the coating device in that the work plan ensures that none of the secondary robotic devices and the scanning device touch the applied coating at each respective weld joint until the coating has fully cured.

18. The system of claim 11, wherein the coating inspection device is configured to inspect each weld joint and in the event that a coating fault is detected, an exact location each coating fault is recorded for each uniquely identified weld joint and transmitted to the processor of the scanning device, wherein the coating fault comprises at least one fault selected from the group consisting of: a coating cavity, a pinhole, a scratch and a coating anomaly.

19. The system of claim 18, wherein once the coating inspection device inspects all of the weld joints and at least one coating fault is detected, the processor of the scanning device then: (1) deploys and instructs the coating inspection device to drive until it passes a deepest joint weld that contains at least one coating fault and is parked at a location within the pipe string that permits parking of at least one or more of the secondary robotic devices at a location that is beyond the deepest joint weld; (2) deploys and instructs the coating device to drive until it reaches the parking location beyond the deepest weld joint that contains the at least one coating fault; and (3) if the at least one coating fault requires surface preparation work, then the surface preparation device is deployed and driven to one of: (a) the deepest weld joint that contains the at least one coating fault; and (b) the parking location beyond the deepest weld joint that contains the at least one coating fault.

20. The system of claim 19, wherein once all of the weld joints pass inspection, the processor of the scanning device reviews and confirms the work plan has been fully executed and completed and the scanning device crawls back through the pipe string to a launching end of the pipe string and scans each weld joint as part of a final checkup.

21. The system of claim 2, wherein the processor calculates a driving time of the scanning module to a parking location located beyond a deepest weld joint as: driving time (t)=length of the pipe string/speed of the scanning device, and the time required for the scanning device to detect, scan and uniquely identify each weld joint within the pipe string is calculated as: time (t)=(time to scan a single weld joint) *(number of detected weld joint).

22. The system of claim 1, wherein as part of the generation of the work plan, the processor calculates a time required to deploy all of the secondary robotic devices which is equal to: deployment time (t)=length of pipe string/speed of slowest secondary robotic device.

23. The system of claim 1, wherein the plurality of secondary robotic devices includes a grinding device and as part of the generation of the work plan, the processor calculates a time required to perform grinding at the one or more weld joints is equal to pipe length (m)×number of pipes/speed of the grinding device (m/s)+Σ time required to grind each weld joint.

24. The system of claim 11, wherein as part of the generation of the work plan, the processor calculates a time required to perform surface preparation at the one or more weld joints is equal to pipe length (m)×number of pipes/speed of the surface preparation device (m/s)+Σ time required to surface prepare each weld joint.

25. The system of claim 19, wherein the processor is configured to add a safety factor in the form of time (seconds) added to the work plan that is proportional to a number of weld joints to account for any failed coated weld joints.

* * * * *